Figures 1, 1A:
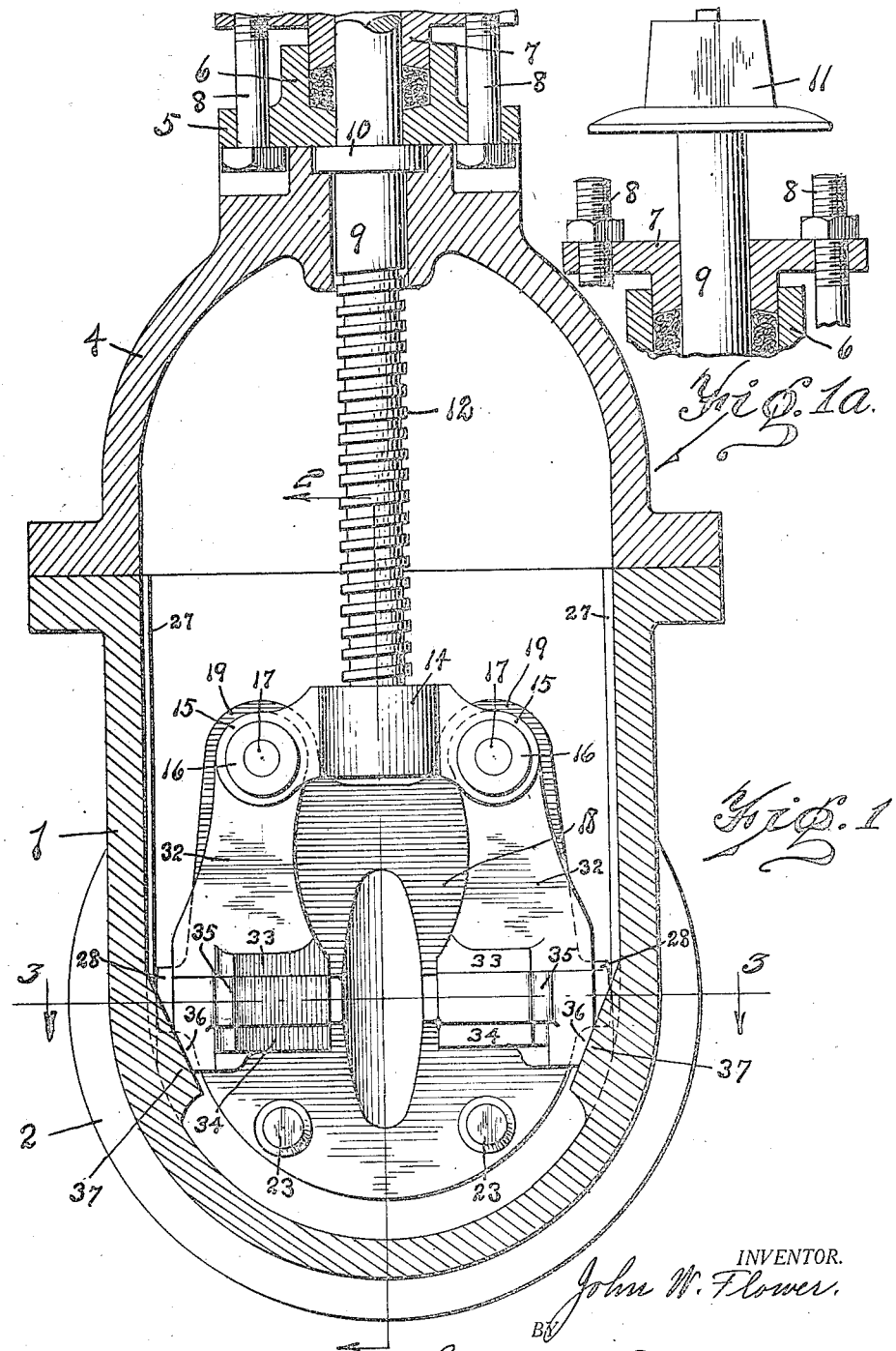

Nov. 13, 1923.

J. W. FLOWER

GATE VALVE

Filed Jan. 5, 1921    2 Sheets-Sheet 1

1,474,026

INVENTOR.
John W. Flower.
BY
Edward N. Pagelsen
ATTORNEY.

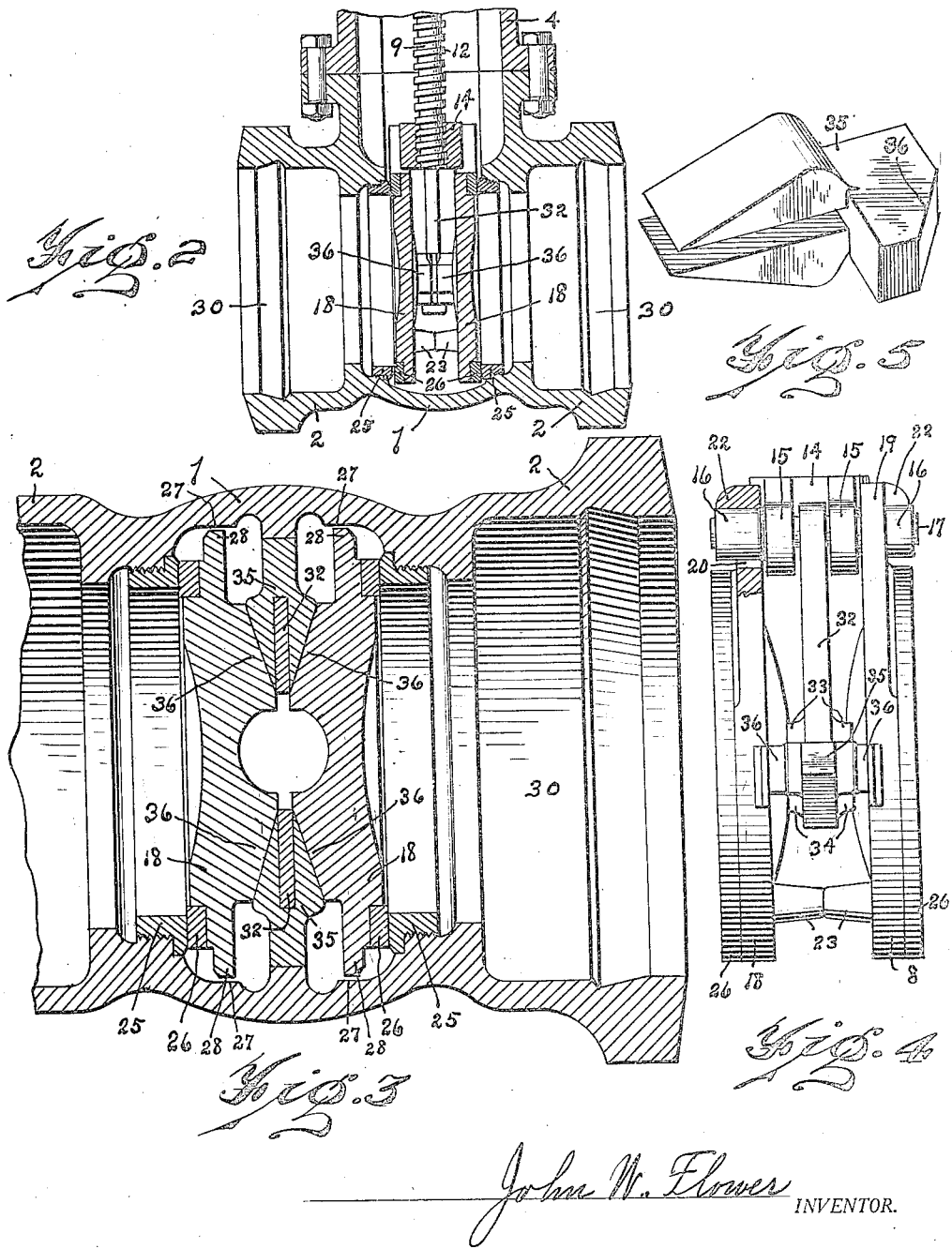

Patented Nov. 13, 1923.

1,474,026

UNITED STATES PATENT OFFICE.

JOHN W. FLOWER, OF DETROIT, MICHIGAN, ASSIGNOR, BY MESNE ASSIGNMENTS, TO MICHIGAN VALVE FOUNDRY AND ENGINEERING COMPANY, OF DETROIT, MICHIGAN, A CORPORATION OF MICHIGAN.

GATE VALVE.

Application filed January 5, 1921. Serial No. 435,119.

*To all whom it may concern:*

Be it known that I, JOHN W. FLOWER, a citizen of the United States, and residing at Detroit, in the county of Wayne and State of Michigan, have invented a new and Improved Gate Valve, of which the following is a specification.

This invention relates to gate valves for water mains in which the movable portion or gate is in the form of a pair of disks which may be forced apart and against valve seats which are mounted in the valve body substantially in alinement with the stream of water passing through the valve body, and its object is to provide simple, reliable means for forcing the valve disks apart and against their seats after these disks have been alined with the seats and for relieving the pressure on the disks and permitting them to free themselves from the seats before they are moved out of alinement therewith.

This invention is embodied in a valve body having a pair of alined circular valve seats and a screw for moving a gate up and down, that is, at right angles to the central line of these seats, said gate embodying a disk carrier and a pair of disks mounted thereon and adapted to move on the carrier parallel to and transversely to the screw, the valve disks having inclines on their opposed faces, and a pair of wedge bars pivotally mounted at their upper ends on the disk carrier in the plane of the screw on parallel pivots and adapted to swing toward and from the screw, the outer edges of the wedge bars being inclined to co-act with inclines on the inside of the valve body whereby the wedge bars are forced inwardly between the valve disks when the gate is forced down to closing position.

It further consists in forming the wedge bars with removable wedge faces so that they may be replaced when worn.

It also consists in the details of construction illustrated in the accompanying drawings and particularly pointed out in the claims.

In the drawings, Fig. 1 is a vertical central section of this improved gate valve at right angles to the flow of the water, the top of the valve being broken away. Fig. 1ª is a section showing this broken-away portion. Figs. 2 and 3 are sections on the lines 2—2 and 3—3 respectively of Fig. 1, Fig. 2 being on a smaller scale. Fig. 4 is a side elevation of a valve gate. Fig. 5 is a perspective of a removable wedge.

Similar reference characters refer to like parts throughout the several views.

The body 1 of the valve is shown provided with hubs 2 although any other means for connecting with the mains may be employed. The body above the line 3—3 has parallel walls and is closed by means of a hood 4 to which is attached the cap 5, stuffing-box 6, gland 7 and bolts 8. The stem 9 has a collar 10, head 11 and thread 12. This structure is well known and the details are therefore omitted.

The stem 9 screws into the threaded middle portion 14 of the disk carrier which has cylindrical ears 15 and bosses 16 through which the pins 17 extend. The valve disks 18 have ears 19 formed with holes 20 through which these bosses extend, and these holes are of such size that the bosses may move up and down therein as indicated in Fig. 4. I prefer to form the extensions 22 on these ears 19 to lengthen the bearing surfaces of the bosses and ears. The disks 18 are preferably provided with posts 23 to hold them separated the minimum distance.

The body 1 is recessed and threaded to receive the usual valve seats 25 and the disks 18 have the usual bearing rings 26, both seats and bearing rings being usually of gun metal. The body is formed with vertical guide surfaces 27 and I prefer to form the lugs 28 on the disks so that these disks will always be in proper alinement with the water passage 30 and the valve seats 25.

It is necessary that these disks shall be free from the seats as the gate moves up and down but that they shall be in rigid engagement with the valve seats when the gate is in closing position. For this purpose I mount the wedge bars 32 on the pins 17 between the ears 15 so that they may swing freely parallel to the valve seats toward and from the valve stem. These bars are transversely grooved on both sides near their lower ends, and into the grooves between the parallel shoulders 33 and 34 are slid the wedge blocks 35 which taper inwardly and have the same inclination as the cheeks 36 on the inner sides of the disks. These blocks therefore move up and down with the bars 32 and because of the size of the holes 20 in the ears 19 on the disks 18, there is vertical movement of these blocks independent of the disks.

The outer ends of these wedge blocks are formed with inclined edges 36 which are adapted to engage the inclined lugs 37 on the valve body so that when the bars 32 and the wedge blocks are forced down by the stem 9 they will be forced inward by the action of the inclines 36 and 37.

When the gate is moved down by the stem, the disks 18 will hang on the cylindrical lugs 16 until they reach the position shown in Figs. 1, 2 and 3, at which time the inclined surfaces 36 and 37 have forced the wedge blocks 35 toward each other far enough to cause the disks to separate and engage the valve seats 25 with sufficient friction to arrest the disks. Further downward movement of the bars 32 will cause them to move inwardly still farther and to force the disks 18 against their seats with great pressure. It is to be observed that until the disks engage their seats 25 that they are hanging on the bosses 16, and that the distance that they can be forced apart after they thus engage the seats is very small so that the holes 20 in the ears 19 of these disks need be but a few hundredths of an inch larger than the bosses.

When the gate is to be raised, the stem is turned to lift the disk carrier, which causes the bars 32 to rise before the disks, and in rising, the wedge blocks slide up and out on the inclines 37 and permit the disks to be pressed together by the water in the mains and so freed from their seats 25 so that they may be raised by the continued action of the screw threaded stem with a minimum of resistance.

The wedge blocks are preferably but not necessarily made of gun metal and their details as well as those of the parts co-operating therewith may all be changed by those skilled in the art without departing from the spirit of my invention as set forth in the following claims.

I claim:—

1. In a gate valve, the combination of a body having an upright chamber and a transverse passage at the lower end thereof, a pair of valve seats mounted at the lines of connection of the passage and chamber, a screw-threaded stem in said chamber, a disk carrier mounted on the stem and having cylindrical lugs on opposite sides and pins extending through the lugs and across slots between them, valve disks having perforated ears through which the lugs extend, the perforations being larger than the lugs to permit vertical movement between them, wedge bars mounted on said pins and adapted to swing toward each other between the valve disks, and wedge blocks mounted on said bars and adapted to force the valve disks apart when swung toward each other.

2. In a gate valve, the combination of a body having an upright chamber and a transverse passage at the lower end thereof, a pair of valve seats mounted at the lines of connection of the passage and chamber, a screw-threaded stem in said chamber, a disk carrier mounted on the stem and having cylindrical lugs on opposite sides and pins extending through the lugs and across slots between them, valve disks having perforated ears through which the lugs extend, the perforations being larger than the lugs to permit vertical movement between them, wedge bars mounted on said pins and adapted to swing toward each other between the valve disks, and wedge blocks mounted on said bars and adapted to force the valve disks apart when swung toward each other, said valve body and wedge blocks having inclined faces adapted to engage to force the wedge blocks toward each other when the valve disks are moved into alinement with said seats.

JOHN W. FLOWER.